United States Patent

King et al.

[15] 3,666,700

[45] May 30, 1972

[54] POLYVINYL CHLORIDE COMPOSITION

[72] Inventors: Laurence F. King, Mooretown; William Taylor, Sarnia, Ontario, both of Canada

[73] Assignee: Esso Research and Engineering Company

[22] Filed: Dec. 3, 1970

[21] Appl. No.: 94,832

[52] U.S. Cl. ............... 260/28.5 D, 260/45.7 P, 260/45.75 K, 260/890, 260/899
[51] Int. Cl. ..................................... C08c 11/70, C08c 11/66
[58] Field of Search .......................... 260/28.5 D, 45.7 P

[56] References Cited

UNITED STATES PATENTS

| | | | |
|---|---|---|---|
| 3,061,583 | 10/1962 | Huhn et al. | 260/45.7 P |
| 3,231,529 | 1/1966 | Kuhn et al. | 260/28.5 D |
| 3,539,480 | 11/1970 | Groff et al. | 260/26.5 D |

OTHER PUBLICATIONS

The Influence of Lubricants on Rigid PVC, Jacobsen, British Plastics, June, 1961, pages 328–333

*Primary Examiner*—Morris Liebman
*Assistant Examiner*—S. L. Fox
*Attorney*—Chasan and Sinnock and Harold Einhorn

[57] ABSTRACT

A polyvinyl chloride composition is prepared from a polyvinyl chloride resin having a weight average molecular weight of about 40,000 to about 90,000 in combination with an organophosphite chelator, a thio-organotin stabilizer, and a lubricant system consisting of a white oil and a microcrystalline petroleum wax. This composition gives a product which is characterized by easy processability, high clarity, and greatly reduced yellowing tendency; thus, minimizing or eliminating the need for a color masking agent (e.g., a blue or violet toner).

11 Claims, 1 Drawing Figure

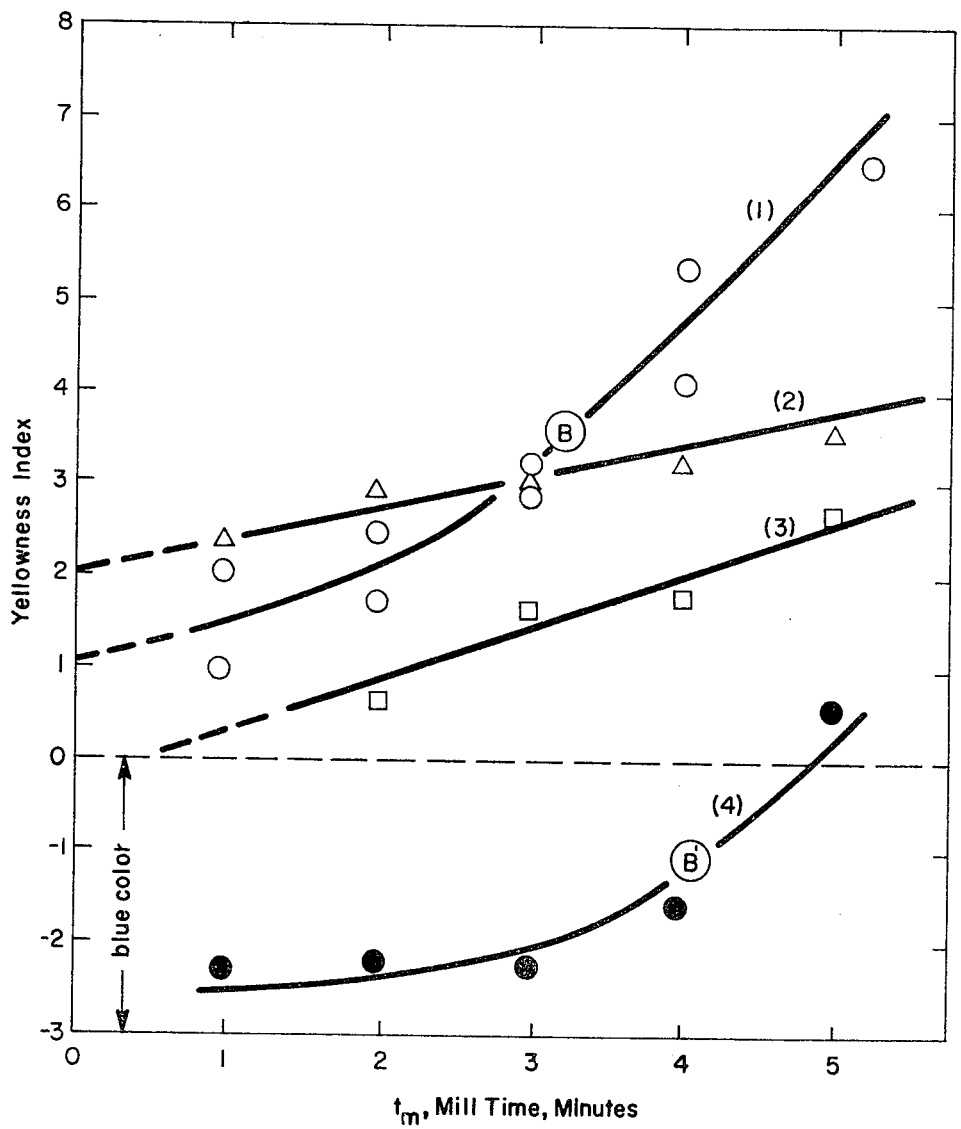

POLYVINYL CHLORIDE COMPOSITION

BACKGROUND OF INVENTION

It has long been known that to produce a transparent, colorless polyvinyl chloride composition useful, for example, in blow-molded products such as bottles, it was necessary to add varying amounts of blue or violet toners as color masking agents. These toners may be divided into two general types: organic and inorganic.

No matter which type is chosen, however, serious problems are encountered. For instance, the amount of toner that could be added has been limited by the loss of clarity and "sparkle," i.e., decrease in light transmittance of the bottle or film due to the pigment particles.

Further, since the coloring agents themselves, particularly the organic dyes and pigments, are known to be thermally unstable and break down during processing of the compounds to give colorless products or promote yellowing, use of these materials has made production of a material of the desired hue extremely difficult. These chemical side reactions of organic colorants, together with the simultaneous degradation of the conventional lubricants and other additives used in the formulation, has greatly hindered control of product quality with any acceptable degree of precision. Therefore, because of their higher thermal stability, inorganic colorants are often preferred. However, the inorganic colorants have low tinctorial strength and consequently have had to be employed in much larger amounts, thus aggravating the clarity problem.

THE PRESENT INVENTION

It has now been discovered that it is possible to prepare an exceptionally thermally stable polyvinyl chloride composition which is capable of forming, without the use of masking agents, low color products which are comparable with conventional polyvinyl chloride compositions employing large amounts of these agents. Further, it has been found that by incorporation of very small amounts of these agents, transparent films and bottles can be produced which are superior in many respects to conventional products currently available. While prior art compositions yield products of widely fluctuating quality at processing temperatures in the range of 400°–425° F., it has been found that the present compositions will consistently produce high quality products at temperatures at least as high as 440° F.

The novel compositions of this invention comprise a polyvinyl chloride resin in combination with an organophosphite chelator, an organotin stabilizer, a white oil, and a microcrystalline petroleum wax. By careful control of each of these variables it is possible to obtain a rigid compound which is characterized by easy processability, a greatly reduced yellowing tendency during processing and fabrication and products of high clarity and "sparkle."

The term "polyvinyl chloride resin" as used in this invention is meant to include both homopolymers of polyvinyl chloride and co- and terpolymers of vinyl chloride with comonomers such as vinyl acetate, vinyl formate, alkyl vinyl ethers, ethylene, propylene, butylenes, vinylidene chloride, alkyl acrylates and methacrylates, alkyl maleates, alkyl fumarates, etc. Preferably, at least 80 percent, and most preferably 100 percent, of the monomers to be polymerized will be vinyl chloride monomer. These resins have a weight average molecular weight of about 40,000 to about 90,000, and preferably from about 55,000 to about 80,000. Inherent viscosity (as measured by ASTM D1243–60, Method A) will generally be in the range of about 0.5 to about 1.0, preferably in the range of about 0.6 to about 0.9. The method of preparation of these resins is not critical and any of the well-known suspension techniques may be employed.

The organophosphite chelators useful in the instant invention are those having a refractive index at 25° C. in the range of about 1.48 to about 1.54. The chelators should also contain at least one unsubstituted phenyl group and one alkyl, cycloalkyl or alkyl substituted cycloalkyl group, each directly attached to the phosphite radical. Thus, compounds such as phenyl diisodecyl phosphite which has a refractive index of 1.48 at 25° C., diphenyl octyl phosphite which as a refractive index of 1.52, a polymeric phosphite which has a refractive index of 1.53–1.54 and the following structural formula:

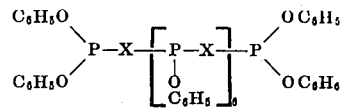

where X = "polypropylene glycol 100" = $-O(CH_2)_n-O-$ wt. % phosphorus = 11.8
where $n$ = 7–8
molecular weight = 2,100 and Weston 243–B phosphite, a crystalline solid at 25°C. which has the following structural formula:

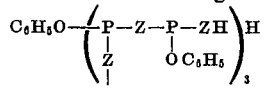

etc., would be suitable for use in the instant invention. Conversely, compounds such as triphenyl phosphite, distearyl pentaerythritol diphosphite, tris-nonylphenyl phosphite, t-butylphenyl phosphite, trilauryl tri-thio phosphite, etc., do not fulfill the above requirements and have been found to be unsuitable. Particularly preferred organophosphite chelators include phenyl diisodecyl phosphite, diphenyl octyl phosphite, Weston 243–B phosphite, and the above-mentioned phenyl propylene glycol 100 polyphosphite of 2,100 molecular weight.

The metallic stabilizers useful in the instant invention include any of the conventional organotin stabilizers known in the art. Representative examples of these stabilizers include, but are not limited to, dibutyl tin maleate, dioctyl tin dilaurate, dibutyl tin bis (5-dodecyl-3-mercapto) isobutyrate, dibutyl tin diphenyl mercaptide, etc. The thio-organotin stabilizers are preferred.

The lubricant system employed in the instant invention consists essentially of two highly refined, colorless hydrocarbon fractions: i.e., (1) a while oil and (2) a microcrystalline petroleum wax. The white oils are prepared from petroleum distillates, which are essentially a paraffinic-naphthenic feed stock, by treatment with fuming sulfuric acid. The acid removes substantially all unsaturated and aromatic components as sulfonates. Subsequent treatment of the raffinate comprises neutralization, steaming and clay percolation whereby other components deleterious to clear polyvinyl chloride compounds are removed. These oils should have a minimum color on the Saybolt scale of +30, a flash point (Cleveland Open Cup) of at least 300° F., and a viscosity at 100° F. of about 45 to about 500 S.U.S. The preferred white oils are those in the low viscosity range of 50 to about 100 S.U.S. at 100°F., e.g., Marcol 52 and Marcol 70 marketed by Humble Oil and Refining Company. Higher viscosity white oils tend to reduce the clarity of transparent PVC somewhat.

The microcrystalline petroleum waxes used herein are prepared from the first cut of paraffin SAE 10–40 grade feedstocks and are refined by a hydrofinishing method. The composition of these waxes may vary slightly but preferably should contain a minimum of 99 percent straight chain paraffins. These waxes have a molecular weight in the range of about 400 to about 500, a color on the Saybolt scale of +30 minimum, a melting point in the range of 140°–165° F., a maximum oil content of 0.5 percent, and a viscosity at 210° F. of 35–50 S.U.S. For good general discussions of microcrystalline waxes and white oils, including methods of preparation, see "-

Microcrystalline Waxes," pages 181–188 and "Petroleum White Oils and Sulfonic Acids," pages 189–193, both in *The Science of Petroleum*, Vol. V, Part III, Oxford University Press (1955), each of which is incorporated herein by reference.

A typical formulation for the present novel composition is as follows: 100 parts of resin, about 1.5 to about 4 parts, preferably 2–3 parts, of stabilizer, about 1 to about 3 parts of chelator, about 0.1 to about 2 parts, preferably 0.5–1 part of white oil, and about 0.1 to about 2 parts, preferably 0.5–1 part, of microcrystalline petroleum wax. In addition to these materials, it is often desirable to add about 1 to about 5 parts of a processing aid of the polyacrylate or polymethacrylate type, e.g., polyethyl acrylate and polymethyl methacrylate. For certain uses such as bottles, it is also desirable to include 10–20 parts of an impact modifier, preferably an elastomeric terpolymer of the methacrylate-butadiene-styrene type.

The above-mentioned materials are typically mixed in a high speed blender in the order shown in Table I at various temperatures depending on the melting or softening point of the additive. The order of mixing is, however, not critical and variations may be made if desired.

TABLE I

| Order | Additive | Temp. (°F.) | Time (Min.) |
|---|---|---|---|
| 1 | Resin (and color if desired) | 90–100 | 10 |
| 2 | Stabilizer, Oil, Chelator, Processing Aid | 140 | 10 |
| 3 | Impact Modifier, Wax | 180 | 10 |
| 4 | — | 140 | 20 |
| 5 | — | 110 | Dump |

Color concentrates or masking agents (blue toners) are almost invariably used to mask yellowing in the prior art resin compositions. However, incorporation of these toners decreases clarity and often degrades the thermal stability of the resin. Hence, it is most desirable to minimize the amount of toner added. By using the compositions of the instant invention, it is possible to greatly reduce or completely eliminate the amount of blue toner previously required while, at the same time, obtaining a thermally stable, easily processed product of high clarity. For instance, evaluation of a compound prepared according to the foregoing specifications and formulations without addition of blue toner gave a product comparing favorably in terms of clarity and color with that of a typical prior art composition containing the normal amount of bluing agent. FIG. 1, which is a plot of yellowness index (Y.I.) versus mill time in a dynamic mill stability test performed at 400° F., summarizes the comparative data obtained for the compound of the instant invention and for that of the prior art. Curve (1) represents a plot of the data obtained for the prior art composition; Curve (2) represents the compound of the instant invention containing no blue toner; Curve (3) represents the identical compound as that used in Curve (2) but with 0.025 parts blue toner added; Curve (4) represents the same composition as that used in Curve (2) but with 0.050 parts blue toner added. The formulations for each of the compositions shown in FIG. 1, including that of the prior art, are shown in Table II below; all amounts shown are in parts by weight:

TABLE II

| | Composition | | | |
|---|---|---|---|---|
| | (1) | (2) | (3) | (4) |
| Resin[a] | 100 | 100 | 100 | 100 |
| Impact Modifier[b] | 12 | 12 | 12 | 12 |
| Thio-Organotin Stabilizer | 3 | 2 | 2 | 2 |
| Processing Aid[f] | 3 | 3 | 3 | 3 |
| Chelator[c] | None | 1.5 | 1.5 | 1.5 |
| Lubricant | 1.5 | 1.0[d] | 1.0[d] | 1.0[d] |
| Blue Toner[e] | 0.050 | 0.000 | 0.025 | 0.050 |

[a] All resins are PVC homopolymers with K-values of 62, 63, 63, and 63, respectively.
[b] Methacrylate-butadiene-styrene terpolymer.
[c] Phenyl diisodecyl phosphite.
[d] Equal amounts of white oil and microcrystalline petroleum wax.
[e] Ultramarine violet.
[f] Methyl Methacrylate polymer.

The shapes of the curves in FIG. 1 and their average slopes (at 3 minutes) are an indication of thermal degradation. The prior art material, (Curve (1)), is exponential, i.e., shows an accelerating rate of degradation even in the extremely short time interval of 5 minutes and the slope $d(Y.I.)/dt$ at 3 minutes is 1.5. Curves (2) and (3) are linear, showing a constant and much lower rate of degradation, the slopes being 0.35 and 0.5, respectively. Curve (4) is exponential, probably due to the excessive amount of added color, but the slope at 3 minutes is only 0.4.

Linearity and a low value of the slope are characteristic of compounds that permit a high degree of operational latitude in processing. This is most desirable in commercial practice since a large number of operating variables must be closely controlled.

There are two types of blue-violet toners, which may optionally be included in the instant formulation. They may be classified as organic and inorganic toners. Suitable toners of the former type are organic pigments such as Kromyl violet, Calco violet, Sudan Irisol, phthalocyanine blue; and organic dyes such as azo-blue, anthraquinone violet and acetate violet. The organics are limited in terms of heat resistance, light-fastness, bleeding and high cost, but have high tinting strength; and the dyes in particular, being soluble, are easy to incorporate into vinyl plastics. Generally preferred colorants for use as toners are the inorganic pigments, e.g., ultramarine violet or blue, because of their superior thermal stability. Brightness and tinting strength are not as great, however, as for other colorants.

With organic pigments the concentration suitable for color toning is up to 0.005 parts per 100 parts of resin, and preferably at least 0.0005, while with inorganic pigments the concentration is up to 0.03 parts per 100 parts, preferably at least 0.005, of resin. The precise amount chosen will depend on the tinting strength of each colorant and the yellowing tendency of the various additives employed in the polyvinyl chloride formulation at the processing temperature.

Since a major use of polyvinyl chloride resin compositions such as those described herein is in production of blow-molded products such as bottles, studies were made to determine the correlation between performance in dynamic mill stability tests and that in extrusion blow-molding operations for the compounds of the instant invention and the prior art composition used for comparison purposes.

In the prior art on polyvinyl chloride, many attempts have been made to correlate the results of laboratory tests such as dehydrochlorination rate, oven heat stability and dynamic mill stability with commercial operations such as calendering, injection molding and extrusion-blow molding. Little success has been achieved. The fundamental weakness in the prior art approach is that most laboratory tests have involved a long residence time at relatively low temperatures, whereas commercial operations involve a very short residence time, generally at higher temperatures. In extrusion-blow molding of polyvinyl chloride, for example, the residence time is only about 1 to 3 minutes at a melt temperature in the range of 375° to 425°F. Mill stability tests carried out at 350°F. for 1 or 2 hours are therefore meaningless and the same applies, only more so, to static evaluations in the oven at similar temperatures.

As a prelude to the instant invention, comparative data were obtained on a large number of blow molding compounds, all containing thio-organotin stabilizers but different lubricants. Representative data are presented in Table III, below.

TABLE III.—CORRELATION BETWEEN MILL STABILITY TEST AND EXTRUSION-BLOW MOLDING

Compounds with thio-organotin stabilizers [1]

| Compound | Extrusion-blow molding | | 3″ mill test at 400° F.,[2] minutes |
|---|---|---|---|
| | Stock temp., ° F. | Yellowness index of bottles | |
| 1 | 410–415 | 4.3 | 1.8 |
| 2 | 410–415 | 5.7 | 2.2 |
| 3 | 410–415 | 5.7 | 3.0 |
| 4 | 410–415 | 4.0 | 2.7 |
| 5 | 410–415 | 2.5 | 2.3 |
| 6 | 410–415 | 8.9 | 3.3 |
| Average | | | 2.6 |

[1] All contain blue toner.
[2] $t_{mb}$ = Time required to give same Y.I. as bottles.

The dynamic mill stability test was drastically modified so as to limit observation to the very early stages of thermal degradation, specifically 1 to 5 minutes (an area of operation which has been totally neglected in the prior art) and parallel optical data were obtained on products made by extrusion-blow molding of the same compounds. The mill temperature selected was in the range of melt temperatures commonly found during commercial extrusion and blow molding. The correlation points for identical yellowness index (on specimens of the same thickness) were at about 3 ± 1 minutes mill time for a large number of organotin stabilized compounds.

These same tests were performed for the prior art composition and the compounds of the instant invention. Point (B) on FIG. 1 indicates the correlation point for the prior art composition. By comparing the yellowness index at this point with the yellowness index at the correlation point (labeled point B') for the product of the instant invention (curve 4), where each employs 0.05 parts of blue toner, it can readily be seen that the products of the instant invention are much superior. In fact, 0.05 parts of this blue toner is well in excess of the amount required for the instant products to show zero color. By contrast, the prior art composition shows a yellowness index in excess even of the product of the instant invention employing no toner.

Yellowness Index as used herein is determined according to the standard procedure designated as ASTM D1925–63T. The formula employed is as follows:

$$Y.I. = \frac{100(1.28X_{CIE} - 1.06Z_{CIE})}{Y_{CIE}}$$

The most critical factors in a rigid polyvinyl chloride composition are the stabilizers and lubricants employed. Fundamental differences exist between the compositions of the instant invention and those of the prior art in these respects. The typical prior art composition contains no chelator; and the stabilizer-lubricant system is of such a type as to depress the glass transition temperature of the polymer by 12° C. under a standard set of testing conditions (differential scanning calorimetry at 10° C./ minute heating rate). The composition of the instant invention, on the other hand, contains a chelator of a preferred type as hereinbefore described; and the stabilizer-lubricant combination used is a non-plasticizing type in that it depresses the glass transition temperature of the polymer by only 5° C., thereby substantially retaining the desirable high heat distortion temperature of the polymer. Good processability of this composition is nevertheless assured by the white oil-microcrystalline wax combination which is extremely effective at the molten plastic-metal interface. The most vital difference between this lubricant combination and that of the prior art appears to be in the degree of refinement of the components. The white oil and wax were both extremely highly refined, by (a) fuming acid plus clay percolation and (b) hydrogen treatment, respectively, whereby components, e.g., unsaturates and aromatics, which cause thermal degradation of polyvinyl chloride, were substantially removed. Lubricants of the prior art composition, on the other hand, contribute materially to yellowing of polyvinyl chloride, as is evident from the experimental data obtained.

The compositions of the instant invention may be employed either as powder blends or in pellet form. Each method has its advantages and disadvantages. The powders, for example, are less expensive and require less pre-processing but require special extrusion techniques. The pellets are cleaner and easier to use, e.g., the dust problem is eliminated. Pellets are generally prepared by feeding a powder blend (prepared in a high speed mixer or ribbon blender) into a continuous mixer where the composition is heated to about 400° F. The composition is removed therefrom in the form of "cakes" and fed to an extruder. It emerges from the extruder in continuous strands which are run into a cooling bath and subsequently chopped to appropriate size.

When employing powder blends directly in extrusion-blow molding, particle size is of some importance. Median particle size should be in the range of 130 to 200 microns, with no more than about 20 percent of the particles having a particle size of less than about 75 microns.

Products of the instant invention were further distinguished from the prior art composition by rheological studies.

Melt flow data were obtained on the prior art composition and composition (4) of Table II in an Instron rheometer at shear rates in the range of 3 to 3,000 reciprocal seconds and at temperatures commonly encountered in extrusion-blow molding of polyvinyl chloride: 375°, 400° and 410° F. Although at all temperatures the apparent melt viscosities of the prior art composition and composition (4) were practically identical and composition (4) was only slightly superior as measured by smoothness of the extrudate, there were significant differences in elasticity of the plastic melt and susceptibility of this property to changes in shear rate and temperature.

It is well-known in the art that polymer melts generally increase substantially in diameter as they emerge from an orifice. The phenomenon is referred to as die swell ($\phi$) and is attributed to elasticity of the molten plastic. Besides being a function of the additives used in the formulation, elasticity increases with increasing shear rate and temperature, i.e., with the greater mechanical and thermal stress to which the plastic is subjected during extrusion. It is generally recognized in extrusion technology that die swell should be minimal, though this is difficult to accomplish because the mechanism is not fully understood.

Extrudates from a rheometer capillary of 0.0500 inches in diameter, under the operating conditions hereinbefore described, were measured by a micrometer gauge after the samples had cooled. The experimental data are summarized in Table IV at two shear rates: 50 and 250 reciprocal seconds, the former being typical of most extrusion processes and the latter of extrusion-blow molding (in which dies of smaller diameter are used).

Die swell is the percentage increase in diameter of the extrudate. It was observed that composition (4) exhibited significantly less die swell than composition (1) over the entire range of shear rates and temperatures, the difference being greatest at the highest temperatures, 400°–410° F., which is the melt or stock temperature of these specific compounds during blow molding. The shear susceptibility of die swell was also calculated from the slope ($d\phi/ds$) of the die swell-shear rate curve at each temperature. Composition (4) had a significantly lower value of the slope than the prior art composition. The temperature susceptibility of die swell ($d\phi/dt$) was also calculated, at two shear rates, and composition (4) had a lower value than composition (1), particularly at the higher shear rate encountered in extrusion-blow molding.

TABLE IV.—MELT ELASTICITY OF COMPOUNDS

| | Temperature (t), °F. | | | | | | | | | | | |
|---|---|---|---|---|---|---|---|---|---|---|---|---|
| | 375 | | | | 400 | | | | 410 | | | |
| Shear rate (s), sec.⁻¹ | 50 | | 250 | | 50 | | 250 | | 50 | | 250 | |
| Composition (Table II) | (1) | (4) | (1) | (4) | (1) | (4) | (1) | (4) | (1) | (4) | (1) | (4) |
| Die swell, percent | 18.5 | 14.5 | 26 | 22 | 22 | 17 | 29 | 23 | 24 | 19 | 33 | 25 |
| Slope $d\phi/ds$, percent sec | 0.008 | 0.006 | 0.013 | 0.013 | 0.008 | 0.007 | 0.014 | 0.012 | 0.009 | 0.008 | 0.017 | 0.009 |
| Decrease in $d\phi/ds$, percent as compared to A | | 25 | | 0 | | 12 | | 15 | | 10 | | 45 |

Temperature susceptibility of die swell:

| | $d\phi/dt$, percent ° F. | |
|---|---|---|
| | at s=50 sec.⁻¹ | at s=250 sec.⁻¹ |
| Composition (1) | 0.16 | 0.20 |
| Composition (4) | 0.13 | 0.085 |

The invention will be further understood by reference to the following examples. The polymers used are identified in Table V, below, and specific identifying properties set forth.

TABLE V.—PROPERTIES OF POLYVINYL CHLORIDE RESINS

| | Homopolymers | | |
|---|---|---|---|
| | A | B | Copolymer C |
| Comonomer, wt. percent | | | (¹) |
| Inherent viscosity, ASTM D1243-60, Method A | 0.76 | 0.83 | 0.73 |
| K-value (0.5 g./100 ml. cyclohexanone at 25° C.) | 60 | 63 | 59 |
| Molecular weight (wt. average) | 67,000 | 74,000 | 65,000 |
| Powder density, g./cc | 0.53 | 0.52 | 0.53 |
| Glass transition temperature, ° C | 78 | 79 | 72 |
| Particle size distribution, percent retained on: | | | |
| 60 mesh | Nil | Nil | 0.2 |
| 80 mesh | 0.2 | 0.4 | 1.8 |
| 100 mesh | 13.6 | 6.4 | 11 |
| 140 mesh | 68.0 | 68.6 | 58 |
| 200 mesh | 17.0 | 22.6 | 26 |
| Pan | 1.2 | 2.0 | 3 |

EXAMPLE 1

100 parts by weight of homopolymer B, Table V, 2 parts thio-organotin stabilizer, 1.5 parts phenyl diisodecyl phosphite chelator, 0.5 parts white oil (52 SUS visc. at 100° F.) and 3 parts polymethyl methacrylate processing aid were blended in a Papenmeier high speed mixer at 140° F. for 10 minutes. The temperature was raised to 180° F., 12 parts of methacrylate-butadiene-styrene impact modifier and 0.5 parts microcrystalline wax (159°-160° F. melting point) were added and blended for 10 minutes at 180° F., then at 140° F. for 20 minutes and the contents of the mixer were dumped at 110° F. The product was a free flowing powder identified as composition (2) of Table II.

The blend was processed on a 3-inch mill at 400° F., samples being removed at 1, 2, 3, 4 and 5 minutes, then pressed at 360° F. to 0.02 inch thickness and evaluated by a spectrophotometer-colorimeter for clarity and color in the range of 400–700 M$\mu$ wavelength. Tristimulus values and yellowness indices (Y.I.) were calculated as hereinbefore described and the Y.I. data were plotted as a function of mill time, curve (2) of FIG. 1.

EXAMPLE 1(a)

The same formulation as Example 1 was used except that 0.025 part of ultramarine violet pigment was included. This is composition (3) of Table II and the data are plotted as curve (3) of FIG. 1.

EXAMPLE 1(b)

The same formulation as Example 1 was used except that 0.050 part of ultramarine violet pigment was included. This is composition (4) of Table II and the mill stability data are plotted as curve (4), FIG. 1.

EXAMPLE 2

The same formulation as Example 1 was used except that 0.003 part of the organic pigment Kromyl violet was included. Tristimulus values of milled, pressed specimens and of sections cut from bottles and pressed to the same thickness (0.02 inch ) are given in Table VI. These data indicate a good correlation between the two methods. Yellowness index of the bottle specimens was in the range 0–1, whereas the prior art composition gave bottles with 3.2 yellowness index.

TABLE VI

Tristimulus Values of Specimens

| | Mill Test | Extrusion-Blow Molding | |
|---|---|---|---|
| Temperature, °F. | 400 | 410 | 440 |
| $X_{CIE}$ (red) | 71.2 | 72.8 | 71.5 |
| $Y_{CIE}$ (brightness) | 73.0 | 74.5 | 73.3 |
| $Z_{CIE}$ (blue) | 84.0 | 87.5 | 85.5 |

EXAMPLE 3

A 2,000 lb. sample of powder blend was prepared as for Example 1 except that a lower molecular weight resin (homopolymer A of Table V) was used and the microcrystaline wax content was increased to 1 part per 100 parts of resin. Both of these modifications gave easier processing in commercial equipment. The colorant level was 0.05 parts per 100 parts resin.

The powder blend was fed to a continuous mixer which converted the material to blocks at an output rate of 1,000 lbs. per hour and the blocks were conveyed to an extruder from which strands were taken, cooled and finally pelletized. The pellets were then fed to extrusion-blow molding equipment from which bottles of excellent quality were produced.

EXAMPLE 4

The alkyl vinyl ether copolymer (C of Table V) was blended with the same additives as Example 1 in the same sequence. The yellowness index at 3 minutes was 3.5 and the slope $d(Y.I.)/dt$ was 0.4. This is substantially the same as Example 1.

What is claimed is:

1. A polyvinyl chloride composition which comprises a polyvinyl chloride resin having a weight average molecular weight of about 40,000 to about 90,000 in combination with an organophosphite chelator having a refractive index in the range of about 1.48 to 1.54 and at least one unsubstituted phenyl group and one alkyl or cycloakyl or alkyl substituted cycloalkyl group each attached directly to a phosphite radical of the chelator, an organotin stabilizer, a white oil and a microcrystalline petroleum wax.

2. The composition of claim 1 wherein, per 100 parts of resin, there are present about 1.5 to about 4 parts of stabilizer, about 1 to about 3 parts of chelator, about 0.1 to about 2 parts of white oil, and about 0.1 to about 2 parts of wax.

3. The composition of claim 2 wherein there are present 2 to 3 parts of stabilizer, 1 to 3 parts of chelator, 0.5 to 1 parts of white oil and 0.5 to 1 parts of wax.

4. The composition of claim 1 wherein the organophosphite chelator is selected from the group consisting of phenyl diisodecyl phosphite, diphenyl octyl phosphite, a phosphite having the formula:

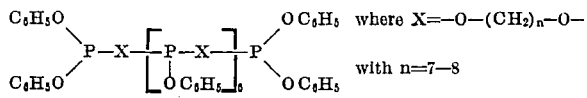

and a phosphite having the formula:

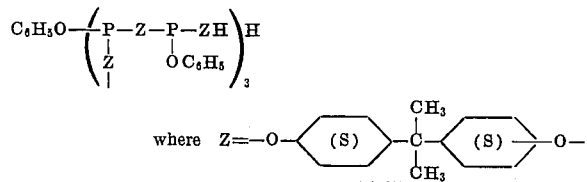

5. The composition of claim 1 wherein the weight average molecular weight of the resin is about 55,000 to about 80,000.

6. The composition of claim 1 wherein the stabilizer is a thio-organotin stabilizer.

7. The composition of claim 1 wherein the white oil has a minimum color on the Saybolt scale of +30, a flash point (Cleveland Open Cup) of at least 300° F., and a viscosity at 100°F. of about 45 to about 500 S.U.S.

8. The composition of claim 7 wherein the viscosity at 100° F. is in the range of 50 to about 100 S.U.S.

9. The composition of claim 1 wherein the microcrystalline wax contains a minimum of 99 percent straight chain paraffins, has a molecular weight in the range of about 400 to about 500, a color on the Saybolt scale of +30 minimum, a melting point in the range of 140° to 165° F., a maximum oil content of 0.5 percent and a viscosity at 210° F. of 35–50 S.U.S.

10. The composition of claim 1 wherein about 1 to about 5 parts of a processing aid selected from the group consisting of polyacrylates and polymethacrylates is added.

11. The composition of claim 1 wherein 10–20 parts of a methacrylate-butadiene-styrene terpolymer is added as an impact modifier.

* * * * *